(No Model.) 3 Sheets—Sheet 1.

F. L. HIGGINS.
BALL BEARING ROLLER COG WHEEL.

No. 598,629. Patented Feb. 8, 1898.

WITNESSES
Harry S. Rohrer.
Frank L. Barnard.

INVENTOR
Frank L. Higgins.
BY
John J. Halsted & Son
his ATTORNEYS.

(No Model.) 3 Sheets—Sheet 2.
F. L. HIGGINS.
BALL BEARING ROLLER COG WHEEL.
No. 598,629. Patented Feb. 8, 1898.
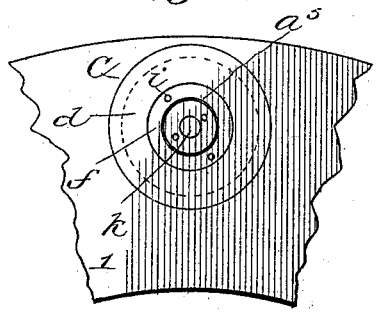
Fig. 3.
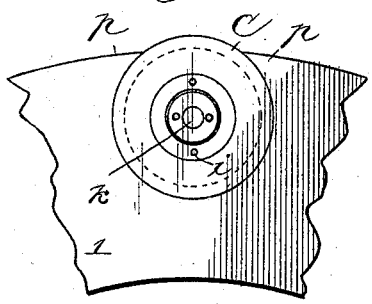
Fig. 4.
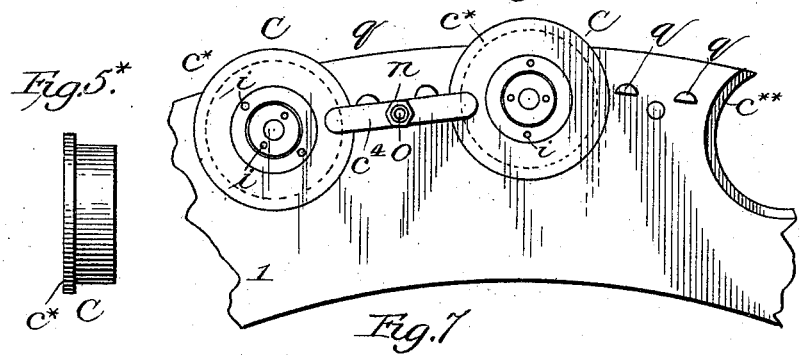
Fig. 5.
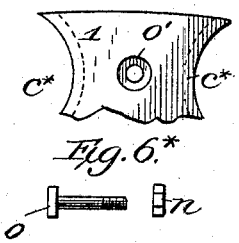
Fig. 6.
Fig. 5.*
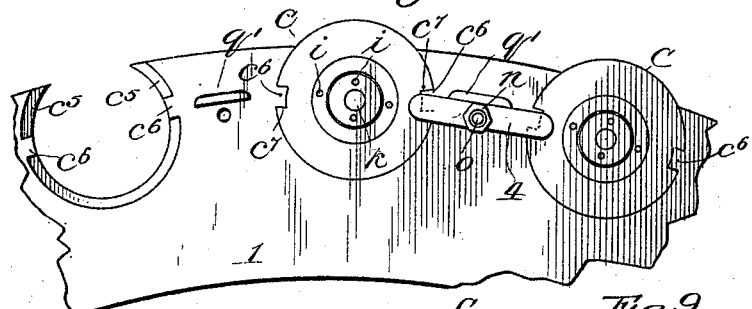
Fig. 7.
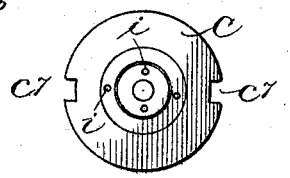
Fig. 6.*
Fig. 8.
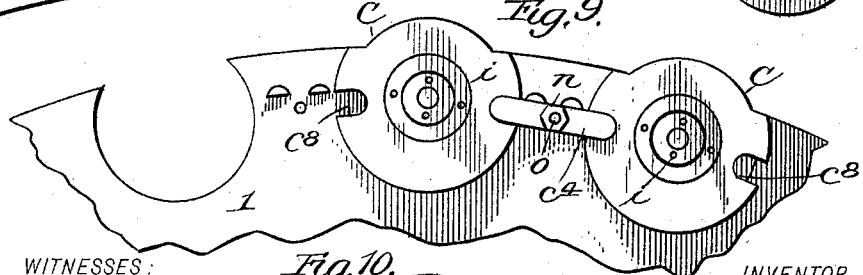
Fig. 9.
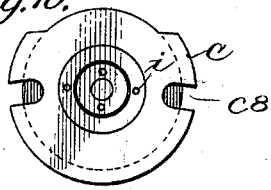
Fig. 10.
WITNESSES:
Harry S. Rohrer
Frank L. Barnard
INVENTOR
Frank L. Higgins
BY John J. Halsted & Son
his ATTORNEYS

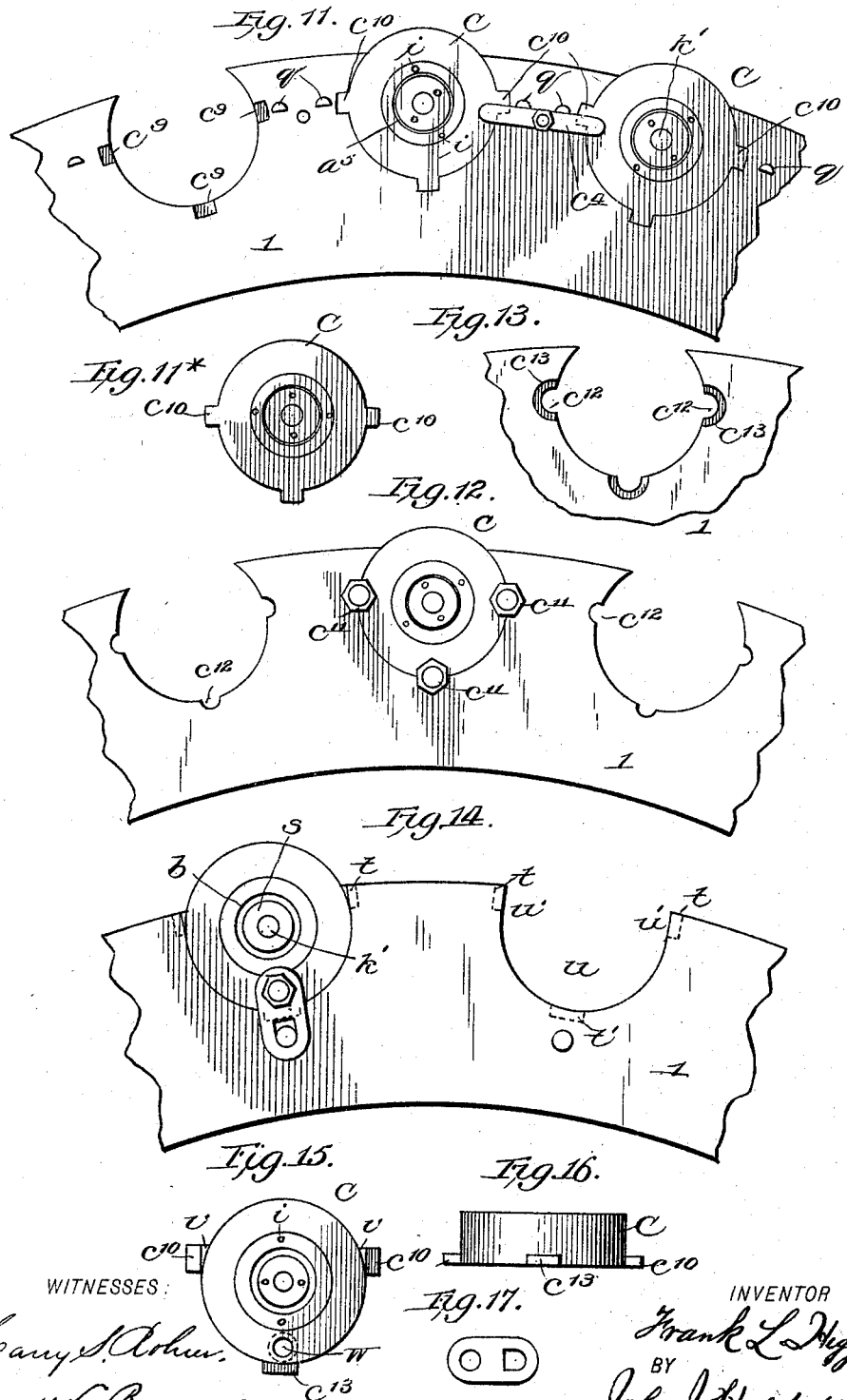

UNITED STATES PATENT OFFICE.

FRANK L. HIGGINS, OF WINTHROP, MASSACHUSETTS.

BALL-BEARING ROLLER-COG WHEEL.

SPECIFICATION forming part of Letters Patent No. 598,629, dated February 8, 1898.

Application filed May 22, 1897. Serial No. 637,684. (No model.)

*To all whom it may concern:*

Be it known that I, FRANK L. HIGGINS, of Winthrop, in the county of Suffolk and State of Massachusetts, have invented certain new and useful Improvements in Ball-Bearing Roller-Cog Wheels; and I do hereby declare that the following is a full, clear, and exact description of the invention, which will enable others skilled in the art to which it appertains to make and use the same, reference being had to the accompanying drawings, and to letters of reference marked thereon, which form a part of this specification.

In my application, Serial No. 623,638, I described a roller-cog wheel in which each of the roller-cogs had a recess in its ends to receive ball-bearing devices and having a long axis projecting outside the wheel-flanges and other devices in connection therewith. In my present invention I dispense with such cavities and with the long axis projecting beyond the wheel-flanges and with sundry appliances incident thereto and make the cog-rollers with conical projections, whereby the ball-bearings are not only applied at a point apart from the body of the roller and near the end of its axle, but the roller has also beyond such cones cylindrical extensions of different diameters, as hereinafter stated, and so make and apply the ball-retaining parts that each ball has four bearings or points of contact with those parts.

In the drawings, Figure 1 represents a side view of a portion of one of my improved wheels in engagement with a companion cog-wheel of well-known form; Fig 2, a lengthwise section, greatly enlarged, through one of the roller-cogs, showing the balls and also the adjacent devices for holding them to place in the peripheral flanges of the periphery of my improved cog-wheel; Fig. 3, a face view, enlarged, of a piece of the wheel, showing a means for securing the sleeves or bearing-box which hold the balls in place. Figs. 4 to 17, inclusive, show sundry variations in the means for securing the sleeves.

Fig. 1 indicates at its left hand a part of a roller-cog wheel made in accordance with my present invention and shows also a part of its companion wheel made with ordinary permanent cogs and not involving in itself any of the novel features of such roller-cog wheel.

The roller-cog wheel has flanges $l$ at its perimeter, between which the roller-cogs A are located. These cogs have at each end a projecting cone $a'$, upon which balls may rest or impinge, as presently to be described, and beyond this cone and integral with it are reduced cylindrical portions $a^2$ $a^3$ of the axle, the latter extending to the outer face or surface of the wheel-flange.

The balls are shown at B.

$b$ $b$ are felt washers held by a screw-piece in a circular chamber $a^4$, made in each end of the body of the roller, and they serve to keep dust from entering the ball-race. These washers are held in position by a metal collar or retainer $c^2$, which is screwed into threads cut, as shown, in the outer edge of such chamber. The chamber $a^4$ has an outwardly-inclined face, as shown at $a^5$, so that when the outer edge of the washer is held by its collar its inner end projects beyond the body of the roller and occupies the space between such body and the inner face of the retainer $g$, hereinafter named.

Each of the balls B, as shown, touches sleeve C at two points and also touches the cone $a'$ at a third point and at a fourth point touches cone-pieces $e$, hereinafter mentioned, thus forming a four-point bearing and thereby providing that in action the thrust shall be directly in line with the plane of the flange.

C C are the sleeves, having their inner perimeter formed, as shown, with two surfaces meeting centrally at an obtuse angle to afford, as above stated, two of the four points of ball-contact of the four-point bearing. Conjointly the two points of contact provide that the thrust above mentioned shall always be in line with the plane of the flange or at right angles to the axle of the roller-cog. Ball-detainers $d$, made with screw-threads, screw into circular and threaded openings made in the outward side of sleeve C, and $g$ is a similar ball-retainer that screws into the inner side of sleeve C, nearest the body of the roller A. While for convenience of manufacture these retainers $g$ may be made as a separate piece, yet they can, if desired, be made in one piece with the sleeve C.

The adjustable ball-bearing cones $e$ (one at each end of the roller-axle) are screwed, as shown, onto the threaded portion $a^2$ of the roller-axle after this axle is in its place in the midst of its surrounding bearing-balls, and this then affords the fourth and last bearing part of the four-point bearing.

A jam-nut $f$ is placed on a reverse thread on each of the reduced extremities $a^3$ of the roller-axle, leaving a clear space all around the perimeter of such nuts, as shown at $a^5$. Each of the cones, jam-nuts, and ball-retainers has holes, as shown at $i\ i$, &c., for receiving the two prongs of a tool suitable for turning them into proper position.

The felt washers $b$ for projecting inwardly toward the center of the roller to a point where the chamber or depression ceases will be crowded outwardly against the face of the ball-retainers $g$, and thus prevent dust from getting into the ball-bearing on the side next the body of the roller-cog. On the other side of the sleeve the opening between the adjustable cone $e$ and the ball-retainers $d$ may be similarly kept free from dust by a felt washer $b'$, held in position by the jam-nuts $ff$, around the inner face of which a chamber is cut, as shown, to make room for said washer. When the wheels are to be used in a dustless situation, these dust-proof devices may be omitted.

To apply this invention to any existing wheel or wheels, one of a pair of such existing wheels must be provided with two flanges projecting in parallel planes from its perimeter.

In spur-gears—that is, where the companion wheels have their cogs in radial lines and their axes parallel—the flanges of my roller-cog wheel project in the same planes as the wheel itself—that is, at right angles to the plane of the wheel's axle. In a miter or bevel gear the flanges would project not in the same plane as that of the wheel itself, but in planes varying according as the relative diameters of the two companion wheels vary from each other.

Where the roller-cog wheel and its companion wheel having the ordinary or fixed cogs are of the same diameter, the plane of the flanges would be at an angle of about forty-five degrees to the plane of the body of the roller-cog wheel; but where the diameters of the two wheels are not equal to each other the plane of projection of the flanges would be at right angles to a line drawn from the point in each flange where the center of the axle of the roller-cog is to be to a point where two lines would intersect if drawn from the axles of the two wheels when the latter are in proper working position relative to each other.

The roller-cogs may be secured between the two flanges in a variety of ways, some of which I have illustrated in the drawings.

In Fig. 2, which is a half-section of a sleeve C, is shown how the sleeves are screwed to place in the flanges.

In Fig. 3 the flange $l$ is made wide enough to encircle the sleeve, and the roller A and its axle (which are in one piece) are in such case inserted endwise through the circular openings in the flange, the roller itself being in this instance slightly smaller in diameter than the ball-containing sleeves to permit this insertion. In Fig. 4, similar in principle, the flanges $l'$ are somewhat narrower, but not wide enough to completely encircle the sleeve, but still reaching far enough around to prevent the sleeve from escaping or passing out between the lips or points $p\ p$ of the flanges. This sleeve seat or pocket in the flanges being provided with threads to fit corresponding threads in the sleeve prevents lateral motion of the sleeve except when it is turned on its threads.

Fig. 5 shows another way of securing the ball-bearing device in position. With this no threads are cut on the outside of the sleeve, nor into the face of the hole in the flange, as is shown in Fig. 2 and as is done for Figs. 3 and 4, but instead the sleeve is provided with an annular projection $c^*$, (see Fig. 5*,) extending around the body of the sleeve at one side. This ledge or projection may rest in a corresponding countersink $c^*$ in the flange or may rest on outer surface of the flange. By the combined aid of these annular projections and the two adjustable nut-locked cones $e\ e$ on the ends of the roller-axle, which press inwardly against the balls, the roller-cog is made self-supporting or self-sustaining in its position in the flanges whenever the latter either completely encircle the sleeve or reach far enough to embrace the major position of it. Fig. 5 also shows another and one way of further securing the ball-bearing device in position against lateral motion by means of a yoke $c^4$.

The annular projection $c^*$ (see Fig. 5*) rests in one of the countersinks $c^*\ c^*$, and each end of the yoke rests upon the sides of two adjacent sleeves C, and this yoke is itself held to place by a nut $n$ on the end of a bolt $o$, which passes through a hole in the flange. (See Fig. 6*.) On the reverse side of the flange is a countersink $o'$ for the head of the bolt to prevent its projecting beyond the inside face of the flange. To keep the yoke in position, two small lugs $q\ q$ are provided, (see Fig. 5,) or one larger one, $q'$. (See Fig. 7.)

Fig. 7 shows another manner of retaining the sleeves in position and which may be used, preferably, when the flange is too narrow to reach far enough around the sleeve to afford sufficient restraint against its outward tendency through centrifugal or any other force. In Fig. 7, $c^5$ is a countersink, and $c^6\ c^6$ indicate two notches or breaks in the countersink, or, in other words, portions of the flange left intact and not countersunk, and thus serving as tongues or teeth to fit into corresponding notches $c^6\ c^7$ in the sleeve, as seen in Fig. 8. The yoke $c^4$ may be used or not, as found expedient, with the form shown in Fig. 7.

In Fig. 10 I can dispense with the countersink in the flange, but have notches, channels, or grooves $c^8$ cut through the annular projection and some distance into the surface of the sleeve to receive the ends of the yokes $c^4$, which thus serve not only to prevent lateral motion, but also the centrifugal tendency above named.

Figs. 9 and 10 show how the outwardly-projecting part of this annular portion may be cut away, if desired.

Fig. 11 shows a form in which the countersink does not extend around, as in Fig. 5, but is provided only at those points $c^9$ into which corresponding projections $c^{10}$ on the sleeve (see Fig. 11*) fit. This arrangement also will prevent both the lateral and the outward or centrifugal motion of the sleeve and may be used with or without the yoke $c^4$.

Figure 1:
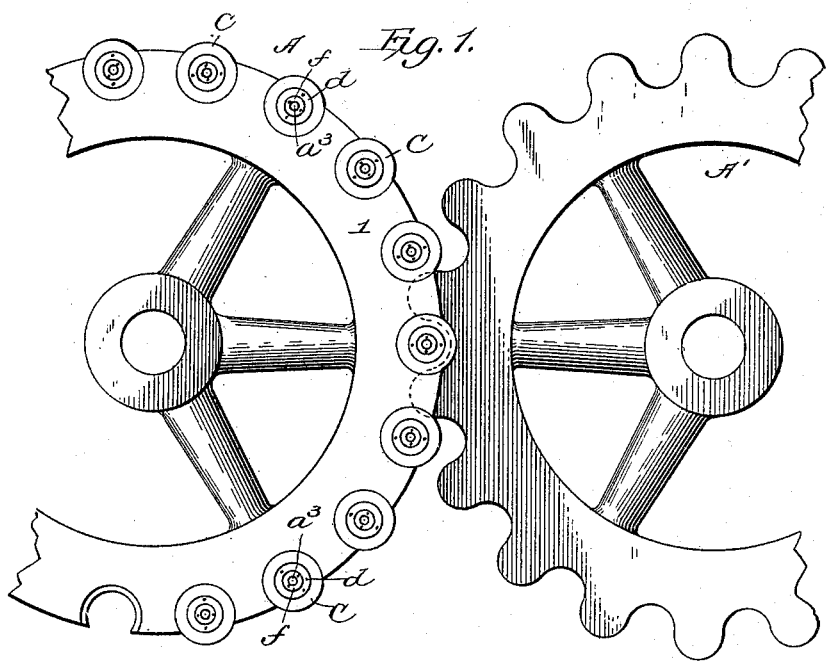
Figure 2:
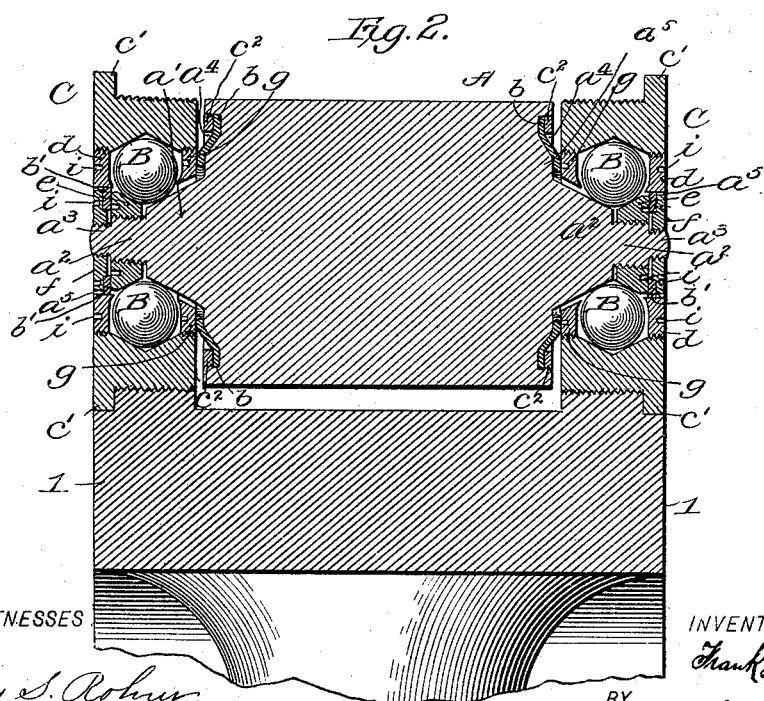

In Fig. 12 I show a still different method of keeping the sleeve C in place. It consists simply in using three bolts $c''$ and their nuts, for which three suitable holes or channels are provided by cutting one-half of the diameter of each bolt-hole in the edge of the sleeve and the other half in the edge of the flange, as shown at $C^{12}$. By suitable countersinks $c^{12}$ (see Fig. 13) for receiving the heads of the bolts these heads will be prevented from interfering with the working of the roller-cog.

In Fig. 14 I show a jam-nut $s$, $b$ being the ball-retainer. The long collar $w'$ is held by a nut and bolt, the collar at one end fitting over a lug on the flange, as shown. The dotted lines at $t\,t$ show under countersinks on the inside edge of the flange. The socket $u$, cut out of the flange, is in the shape of a semicircle, having its ends extended a short distance in straight parallel lines, as shown at $u'\,u'$. This enables the ball-bearing to be inserted in the socket to a distance somewhat greater than one-half its diameter.

In Fig. 15 I show a shoulder $v$ on the sleeve to fill out the space at $u'$ in the socket, and the lugs $c^{10}$ at the inner edge of the sleeve fit in the countersinks $t\,t$. A third projection or lug $C^{13}$ is to fit the countersinks shown at $t'$. A bolt-hole $w$ is to receive an appropriate bolt. Fig. 16 is an edge view of Fig. 15. The dotted lines around this bolt-hole indicate a countersink at the inner end of this hole. The parts $e$ and $f$, being screwed onto the roller-axle $a^2$, must of course turn or revolve coincidently with it, a clear space $f'$ being left between $e$ and $f$ to permit this.

I claim—

1. A roller-cog wheel, having its cogs made with a cone near each end and integral therewith, and also having integral with such roller and cones and at each end, axial threaded projections as set forth, combined with and adapted to receive and hold thereon threaded rings, all substantially as and for the purposes set forth.

2. A roller-cog, having integral therewith the end cones and the end threaded projections, and having in each end of its cylindrical portion an annular chamber with an outwardly-inclined face, combined with and adapted to receive the outer edge of a washer and to cause the projection of its inner edge, all as shown and described.

3. In combination with the roller having the cones and threaded ends as described, and with the wheel-flanges, the sleeves having the two-faced contact-surfaces, the balls, the cones and the jam-nuts screwed on the ends of the rollers, all substantially as and for the purposes set forth.

4. In combination, roller-cogs having their ends terminating in cones from which project threaded ends, combined with balls bearing on the cones and held in place by a suitable sleeve and detainers, substantially as set forth.

5. In combination with the rollers, their cones and threaded ends, the cones $e$, the jam-nuts having a chamber therein and having a reversed thread thereon, and the felt washers between cones $e$ and the nuts, all as set forth.

6. The roller-cogs constructed as shown and described, combined with the peripheral wheel-flanges, sleeves C, made as described, and with the detainers $d$, cones $e$, nuts $f$, and ball-retainers $g$, all substantially as set forth.

7. The roller-cogs, having in each end an annular recess, as described, formed with an outward incline, combined with a felt washer secured at its outer edge in this recess, a portion of such washer lying on such incline and projecting outwardly as shown, and its inner edge projecting beyond the end face of the roller, a metal collar holding such washer at its outer edge, and a retainer between which and the body of the roller the inner edge of the washer is held in place.

FRANK L. HIGGINS.

Witnesses:
CHAS. L. STOWELL,
HAROLD C. BARTLETT.